United States Patent
Ito et al.

(10) Patent No.: US 8,990,454 B2
(45) Date of Patent: Mar. 24, 2015

(54) MEMORY SYSTEM AND WIRELESS COMMUNICATION METHOD BY MEMORY SYSTEM

(75) Inventors: Kuniaki Ito, Chiba-ken (JP); Takashi Wakutsu, Kanagawa-ken (JP); Yasufumi Tsumagari, Kanagawa-ken (JP); Shuichi Sakurai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 13/603,735

(22) Filed: Sep. 5, 2012

(65) Prior Publication Data

US 2013/0268802 A1 Oct. 10, 2013

(30) Foreign Application Priority Data

Apr. 6, 2012 (JP) ................ P2012-087946

(51) Int. Cl.
| | | |
|---|---|---|
| G06F 3/00 | (2006.01) | |
| G06F 5/00 | (2006.01) | |
| G06F 11/07 | (2006.01) | |
| G06F 13/16 | (2006.01) | |
| G06K 19/07 | (2006.01) | |

(52) U.S. Cl.
CPC ............ *G06F 11/0796* (2013.01); *G06F 13/16* (2013.01); *G06K 19/07* (2013.01)
USPC .......................................................... 710/36

(58) Field of Classification Search
CPC .................................. G06F 12/00; G06F 12/04
See application file for complete search history.

(56) References Cited

U.S. PATENT DOCUMENTS

| | | | |
|---|---|---|---|
| 5,253,207 A * | 10/1993 | Shikatani | 365/189.04 |
| 6,009,542 A * | 12/1999 | Koller et al. | 714/53 |
| 7,340,275 B2 | 3/2008 | Hamamura | |
| 7,418,636 B2 * | 8/2008 | Driediger | 714/53 |
| 2008/0163005 A1 * | 7/2008 | Sonksen et al. | 714/41 |
| 2009/0063800 A1 * | 3/2009 | Ehama et al. | 711/163 |
| 2009/0292707 A1 | 11/2009 | Moritani et al. | |
| 2010/0169548 A1 * | 7/2010 | Kanda | 711/103 |
| 2012/0209939 A1 | 8/2012 | Ito et al. | |
| 2012/0210046 A1 | 8/2012 | Ito et al. | |
| 2012/0221770 A1 | 8/2012 | Sakurai et al. | |

FOREIGN PATENT DOCUMENTS

| | | |
|---|---|---|
| JP | 2001-346150 A | 12/2001 |
| JP | 2002-91709 A | 3/2002 |
| JP | 2002-132600 A | 5/2002 |
| JP | 2007-281261 | 10/2007 |
| JP | 2009-282614 | 12/2009 |
| JP | 2010-67060 | 3/2010 |
| JP | 2012-168865 A | 9/2012 |
| JP | 2012-168866 A | 9/2012 |
| JP | 2012-181611 A | 9/2012 |

* cited by examiner

*Primary Examiner* — Elias Mamo
(74) *Attorney, Agent, or Firm* — Oblon, McClelland, Maier & Neustadt, L.L.P.

(57) ABSTRACT

An aspect of the present embodiment, there is provided a memory system including a nonvolatile memory area, a first interface be connected to a first host device, a second interface connected to a second host device, and a controller controlling the first interface such that the first device is configured to prohibit to write data into the nonvolatile memory area on a basis of a command provided from the second host device before the second host device writes data into the nonvolatile memory area through the second interface, wherein the first interface notices an error to the first host device when the first device writes data into the nonvolatile memory area, and the second host device transmits data from an portion not to be written in the nonvolatile memory area to the first host.

17 Claims, 2 Drawing Sheets

MEMORY SYSTEM AND WIRELESS COMMUNICATION METHOD BY MEMORY SYSTEM

CROSS REFERENCE TO RELATED APPLICATION

This application is based upon and claims the benefit of priority from prior Japanese Patent Application No. 2012-087946, filed on Apr. 6, 2012, the entire contents of which are incorporated herein by reference.

FIELD

Exemplary embodiment described herein generally relates to a memory system and a wireless communication method by the memory system.

BACKGROUND

In recent years, an SD card with a function of wireless communication or a function of wireless LAN has been developed.

Such the SD card can be connected to wireless communication network by utilizing the function of wireless communication.

A file stored in the SD card through the wireless communication network can be transferred, for example, by the SD card.

DETAILED DESCRIPTION

Figure 1:
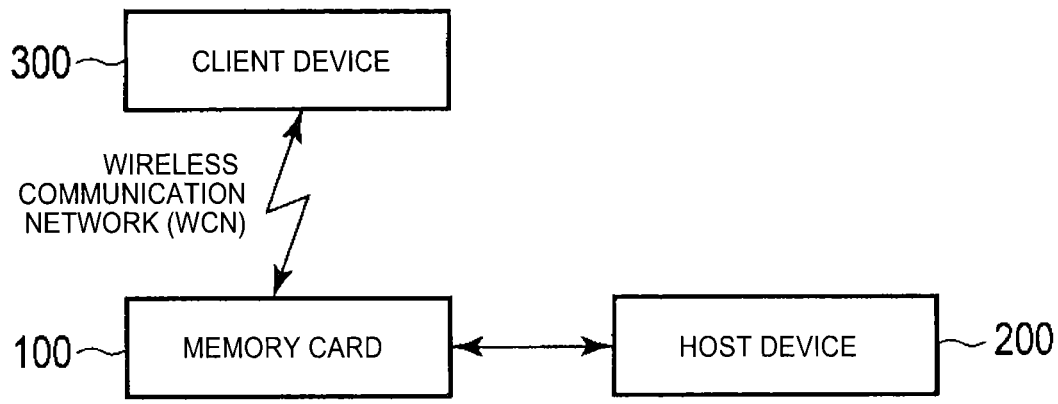
FIG. 1 is a schematic view showing a connection relation between a memory card, a host device and a client device according to an embodiment.

An aspect of the present embodiment, there is provided a memory system includes a nonvolatile memory area a first interface configured to be connected to a first host device, a second interface configured to be connected to a second host device through wireless communication, and a controller configured to control the first interface such that the first device is configured to prohibit to write data into the nonvolatile memory area on a basis of a command provided from the second host device before the second host device writes data into the nonvolatile memory area through the second interface, wherein the first interface notices an error to the first host device when the first device writes data into the nonvolatile memory area in a state that the first interface is controlled such that the first device is prohibited to write data into the nonvolatile memory area, and the second host device transmits data from an portion not to be written in the nonvolatile memory area to the first host device when the first device read out data from the nonvolatile memory area in the state that the first interface is controlled such that the first device is prohibited to write data into the nonvolatile memory area.

Another aspect of the present embodiment, there is provided a wireless communication method by a memory system, the memory system including a nonvolatile memory area, a first interface, a second interface and a control unit, including setting the memory system in a first host device, connecting the second interface to a second host device through wireless communication, controlling the first interface by the control unit to prohibit to write data from the first host device to the nonvolatile memory area, and transmitting data from the second host device to the nonvolatile memory area.

Embodiments will be described below in detail with reference to the attached drawings. Throughout the attached drawings, similar or same reference numerals show similar, equivalent or same components. The description of the same or similar parts and elements will be performed in a case for necessity.

Embodiment

Figure 2:
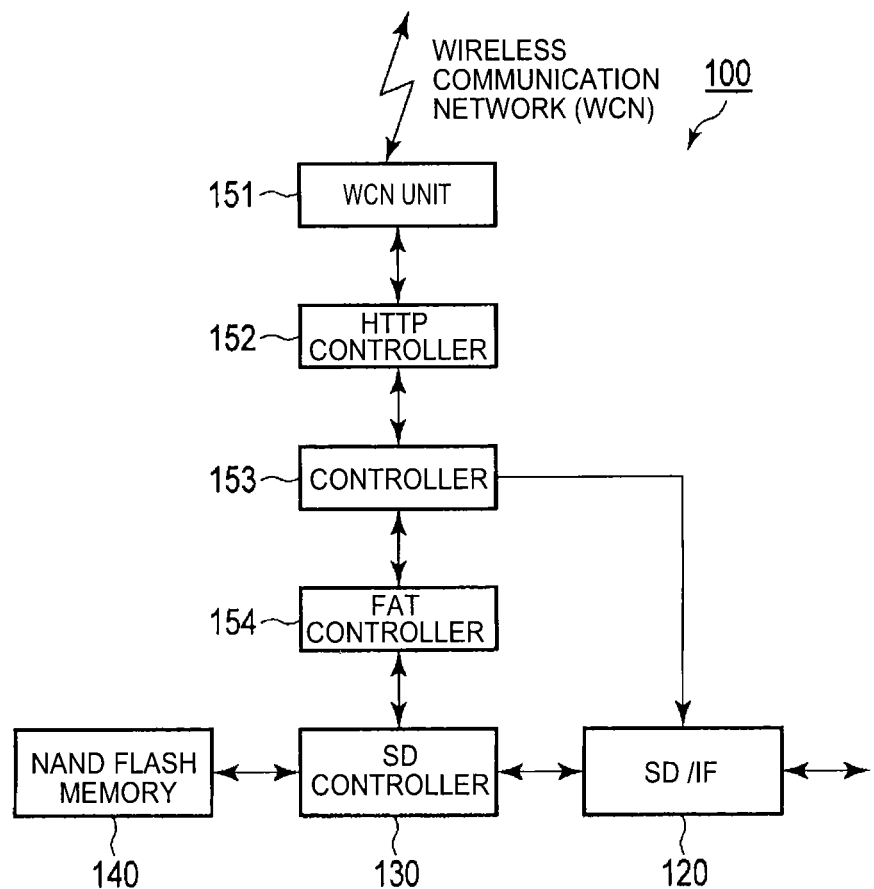
FIG. 2 is a functional block diagram showing a basic constitution of the memory card according to the embodiment.

A basic constitution of a memory card 100, for example, an SD card or the like, including a function of wireless LAN according to an embodiment is described using FIGS. 1, 2. FIG. 1 is a schematic view showing a connection relation between a memory card 100, a host device 200 and a client device 300 according to the embodiment. FIG. 2 is a functional block diagram showing a basic constitution of the memory card 100 according to the embodiment.

<Constitution>

<Method for Basically Using SD Card Corresponding to Wireless LAN>

As shown in FIG. 1, the memory card 100 is installed in the host device 200. The memory card 100 is connected to the client device 300 through a wireless communication network. Here, the memory card 100 is an SD card including wireless LAN, for example, the host device 200 is a digital camera, for example, and the client device is a personal computer or a cell phone, for example.

The memory card 100 is connected to the client device 300 through the wireless communication network by using the host device 200 so as to be able to transfer photograph data from the host device 200 to such the client device 300.

<Basic Constitution of SD Card Corresponding to Wireless LAN>

As shown in FIG. 2, the memory card 100 including a function of wireless LAN, so called merely the memory card 100 hereinafter, is connected to the host device (not shown) through an SD interface. The memory card 100 is received power supply to start action when being connected to the host device 200, so that the memory card 100 performs data processing corresponding to accesses from the host device 200.

The memory card 100 includes an SD interface (I/F) 120, an SD controller 130, a NAND-type flash memory 140, so called merely NAND flash memory or flash memory, a wireless communication (WCN) unit 151, an HTTP (Hyper Text Transport Protocol) controller 152, a controller 153 and an FAT controller (File Allocation Table) 154, for example. The SD controller 130, the HTTP controller 152, the controller 153 and the FAT controller 154 constitute a control unit.

The SD interface 120 performs interface processing between the SD controller 130 and the host device 200. Furthermore, the SD interface 120 prohibits writing data into the flash memory 140 from the host device 200 when receiving a command, which sets on "Write Protect", from the controller 153.

The SD controller 130 is received a write-in command, a read-out command, and an erase command from the host device 200 so as to access an area of the NAND flash memory 140 and to control data transfer processing.

The NAND flash memory 140 includes a memory cell array. The memory cell array includes a plurality of bit lines, a plurality of word lines and a common source line. A plurality of memory cells is located as a matrix in the memory cell array. Each of the memory cells is constituted with an EEPROM or the like, in which data is electrically rewritable, for example.

The wireless communication unit 151, which is described as the WCN unit in FIG. 2, includes a wireless communication interface, a wireless LAN signal processing unit and an antenna receiving and transmitting high-frequency signals, and these devices are not shown. The wireless communication unit 151 controls a function of wireless communication using, for example, Wi-Fi (Trade Mark).

The HTTP controller 152 is a protocol which is used for data communication (transmission and reception) between the wireless communication unit 151 and the client device 300. The HTTP controller 152 is configured to communicate between the memory card 100 and the client device 300 including hyper text described by HTML (Hyper Text Markup Language) or XML (Extensible Markup Language) and a file of image, audio, or video related to a document with information of an expression form.

The controller 153 judges a packet or the like provided from the HTTP controller 152, so as to provide a command to the SD interface 120 and data to the FAT controller 154.

The FAT controller 154 is a file system. The FAT controller 154 carries out data management or the like stored in the flash memory 140.

The host device 200 includes a host controller and issues various kinds of SD commands. The host controller carries out interface processing in a state that the memory card is connected.

The memory card uses hardware resources such as a CPU, a ROM, a RAM, a buffer or the like. The resources are simply described in detail as mentioned below. The CPU controls total action of the memory card 100. A firmware such as a control program or the like which is used as a work area of the CPU, is stored in the ROM. The RAM is used as the work area of the CPU and memorizes the control program, various kinds of tables, an extended register or the like. The buffer temporally memorize a prescribed data, for example, an amount of one page, in data received from the host device 200 when writing data into the NAND flash memory, and memorizes a prescribed data in data transmitting from the host device 200 when reading out data from the NAND flash memory.

Figure 3:
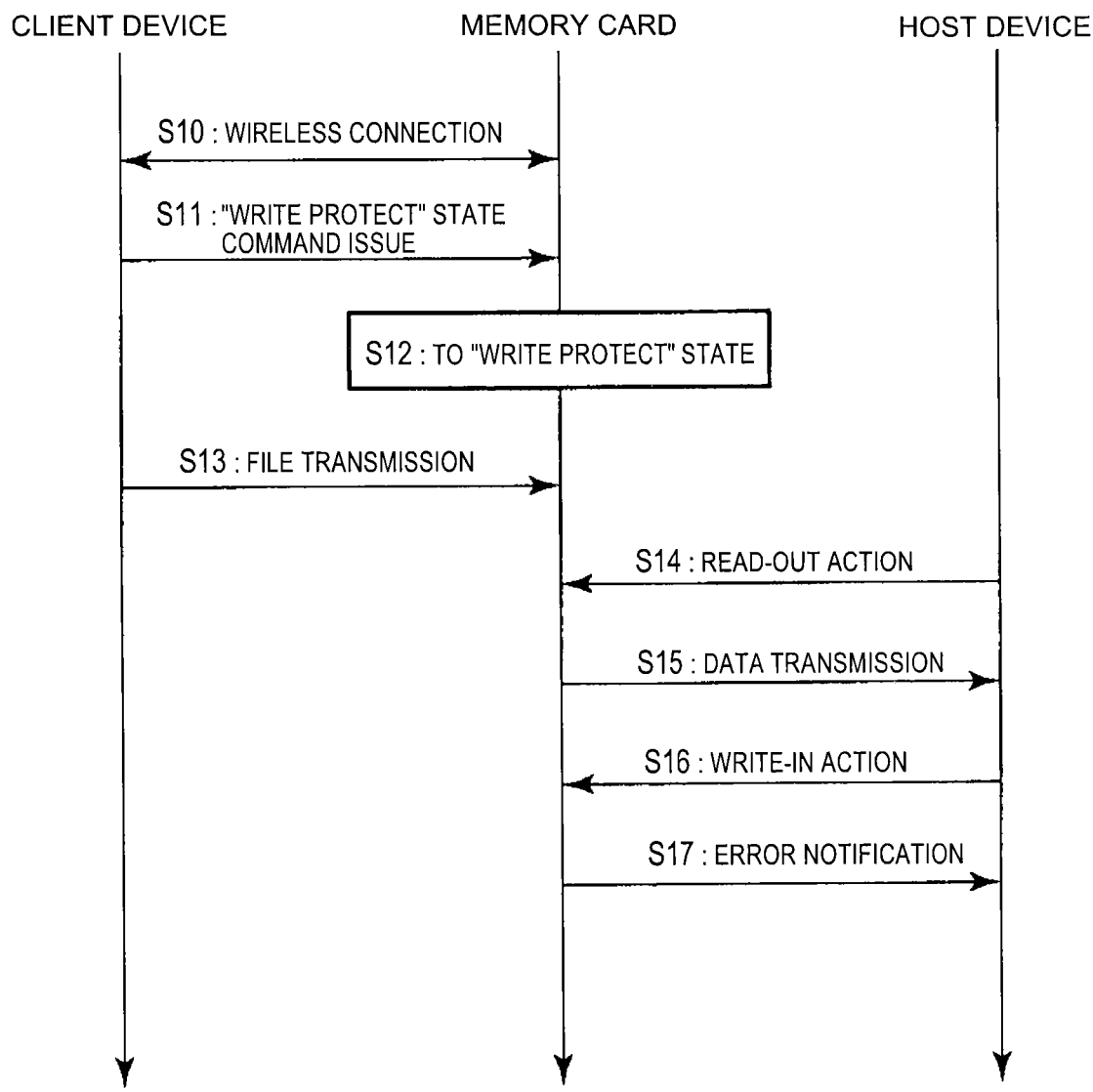
FIG. 3 is a flow chart showing a basic action corresponding to an upload received from the client device according to the embodiment.

Next, a basic action corresponding to an upload received from the client device is described. FIG. 3 is a flow chart showing a basic action corresponding to the upload received from the client device according to the embodiment.

It is probable that a mismatch between FAT information stored in a file of the host device 300 and FAT information stored in a file of the memory card 100 is generated, when the client device 300 uploads the file to the memory card 100 through wireless communication network. Specifically, the memory card 100 includes FAT information cashed by the host device 200. Accordingly, when the client device 300 changes the FAT information of the memory card 100, it is probable that an incoherency between the FAT information cashed by the host device 200 and the FAT information changed by the client device 300 is generated. In such a case, the memory card 100 writes the data into the flash memory by using the function of the wireless communication, and successively the host device 200 writes another file into the memory card 100 may cause to destroy a FAT system so as to be necessary for formatting.

Therefore, the host device 200 connected to the memory card 100 is prohibited to write data into the memory card 100 according to the embodiment when the client device 300 writes a file into the flash memory device 140 in the wireless communication network.

[Step 10] Wireless Connection

The memory card 100 is installed in the host device 200 and is supplied power from the host device 200 to be configured to connect to the client device via the wireless LAN. The client device 300 can access the memory card 100 on a web browser or the like thereof.

[Step 11] Transfer to "Write Protect" State

The client device 300 prohibits the host device 200 from writing data into the memory card 100 before transmitting a file or the like to the memory card 100, when the client device 300 uploads the file or the like on the memory card 100. In other words, the client device 300 issues CGI (Common Gateway Interface) command which transfers the SD interface 120 to "Write Protect" state.

[Step 12] "Write Protect" State

The controller 153 supplies the CGI command to the SD interface 120 when the controller 153 is received the CGI command for transferring to "Write Protect" state via the wireless communication unit 151 and the HTTP controller. Furthermore, the SD interface 120 sets on a function of "Write Protect", which is the "Write Protect" state as software, of the flash memory 140.

[Step 13] File Transfer

The client device 300 transmits the file to be uploaded to the memory card 100 after the client device 300 issues the CGI command, which changes the memory card 100 to "Write Protect" state. In the action mentioned above, the client device 300 may transmit the file to the memory card 100 even in a case that the client device received a notification of the "Write Protect" state from the controller 135, for example.

[Step 14] Reading-Out Action

The host device can read out data from the memory card 100 when the memory card 100 is set to be the "Write Protect" state.

[Step 15] Data Transmission

When the host device issues a read-out command in the "Write Protect" state of the memory card 100, the SD interface 120 supplies the data in the flash memory 140 to the host device 200 in a state that an area, where the host device is going to read out, is set as the same where a file is not uploaded by the host device 300. However, the SD interface 120 notify an error to the host device, in a state that the area, where the host device is going to read out, is set the same as the area where the file is uploaded by the host device 300.

[Step 16] Writing-In Action

The host device can write data into the memory card 100 when the memory card 100 is set to be the "Write Protect" state.

[Step 17]

The SD interface 120 notifies an error to the host device 200 when the host device issues a write-in command in a state that the memory card 100 is set to be the "Write Protect" state. Therefore, the host device can detect that the memory card 100 fails to be written in the data. Accordingly, a user of the host device can recognize the failure to be written.

Effect of Embodiment

According to the embodiment mentioned above, the memory system (memory card) 100 includes the nonvolatile memory area (flash memory) 140, the first interface (SD interface) 120 connected to the first host device (host device) 200, the second interface (wireless communication unit) 151 connected to the second host device 300 (the client device), the controller 153, which is configured to control the first interface 120 that the first host device 200 cannot write data into the nonvolatile memory area 140 on a basis of a command supplied from the second host device 300, before the second host device 300 writes data into the nonvolatile memory area 140 through the second interface 151.

The first interface 120 notifies an error to the first host device 200 when the first host device 200 writes data into the nonvolatile memory area 140 in a state that the first interface 120 is controlled where the first host device 200 cannot write data into the nonvolatile memory area 140.

Furthermore, the nonvolatile memory area 140 transmits data in an area not to be written by the second host device 300 when the first host device 200 reads out data from the nonvolatile memory area 140 in a state that the first interface 120 is controlled where the first host device 200 cannot write data into the nonvolatile memory area 140.

In such a manner, the memory card 100 according to the embodiment described above arbitrarily changes a status due to the command from the client device 300 to be set to a "Write Protect" mode, so that a file system in the memory card is protected due to limitation of access from the host device 200.

When the client device 300 uploads a file or the like on the memory card 100 including a function of wireless LAN through wireless communication network, the file is formed in the memory area in the memory card 100. However, information on the update which the client device 300 conducts is not reflected on the cash information in a file system of the memory card 100, as the upload is conducted in a pass without the host device connected to the memory card 100. As a result, the file system itself may be broken when the host device 200 set the file in the memory area 140 of the memory card 100. Furthermore, time information of the file may not be set in the memory area as the memory card may not have time information in a case that the client device uploads a file into the memory area 140 in the memory card 100 through wireless communication network.

In such a case, the SD interface 120 connecting between the host device and the memory card 100 is preliminarily transferred into the "Write Protect" state, when the client device 300 uploads a file on the memory card 100 mentioned above. In such a step, the host device 300 cannot write data into the host device 200 at least when the client device 300 uploads the file on the memory card 100. Therefore, the problem described above can be prevented so as to protect damage or the like of the data in the memory area 140 of the memory card 100. Consequently, it is capable that a file is surely uploaded from the client device 300 to the memory card 100.

The HTTP controller 152 is described as a protocol in the embodiment mentioned above. However, it is not restricted to the HTTP controller and another protocol which conducts protocol processing can be used. In a similar fashion, CGI command is used as a command supplied to the controller 153 in the embodiment mentioned above. However, it is not restricted to the above case.

Time information of the memory card 100 can be set by using the client device 300 when the file is stored in the flash memory 140 in the memory card 100 from the client device 300. In a case that a file is received from the client device 300 and is stored in the flash memory 140 of the memory card 100, the file can be stored without setting time information of the file when the memory card 100 has not time information.

Furthermore, the client device 300 issues a command in which the SD interface 120 is set to be the "Write Protect" state when the client device 300 writes data into the flash memory 140. The SD interface 120 is set to be the "Write Protect" state when the client device 300 received the command. However, the controller 153 can be set the "Write Protect" state to the SD interface 120, when the controller 153 is received data for the upload from the client device 300

The SD interface 120 retains the "Write Protect" state till power supply is stopped to the memory card 100, or a command or the like to cancel the "Write Protect" state is supplied.

Furthermore, writing data into the flash memory 140 from the host device 200 is prevented by controlling the SD interface 120 in a case that the client device 300 uploads a file to the memory card. However, writing data into the flash memory 140 from the host device 200 is prevented by controlling the wireless communication unit 151 in the case that the client device 300 uploads the file to the memory card.

When a write-in command is issued from the host device 200 in a case that the memory card 100 is set to be the "Write Protect" state, the SD interface 120 notifies an error to the host device 200. In similar fashion, when a cancel command is issued from the host device 200 in a case that the memory card 100 is set to be the "Write Protect" state, the SD interface 120 can notify an error to the host device 200. In such a manner, the host device can detect the host device can detect that the memory card 100 fails to be erased in the data. Accordingly, a user of the host device 200 can recognize the failure to be erased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory system, comprising:
a nonvolatile memory area;
a first interface configured to be connected to a first host device;
a second interface configured to be connected to a second host device through wireless communication; and
a controller configured to control the first interface such that the first host device is configured to prohibit to write data into the nonvolatile memory area on a basis of a command provided from the second host device before the second host device writes data into the nonvolatile memory area through the second interface;
wherein the first interface notices an error to the first host device when the first host device writes data into the nonvolatile memory area in a state that the first host device is prohibited to write data into the nonvolatile memory area, and the second host device transmits data from a portion of the nonvolatile memory area other than a portion of the nonvolatile memory area in which the second host device writes data into the nonvolatile memory area.

2. The memory system of claim 1, wherein
a state, in which the first host device is prohibited to write data into the nonvolatile memory area, is configured to be cancelled by being provided a cancel command from the second host device.

3. The memory system of claim 1, wherein
The second host device is configured to control the second interface so as to prevent to write data into the nonvolatile memory area from the first host device in a case that the second host device writes data into the nonvolatile memory area.

4. The memory system of claim 1, wherein
the second host device is configured to issue the a cancel command so that the first interface issues an error to the first host device in the state that the first host device is prohibited to write data into the nonvolatile memory area.

5. The memory system of claim 1, wherein
the nonvolatile memory area includes an initialization time, and an initialization time of data written in the nonvolatile memory area by the second host device is configured to be set by the second host device.

6. A memory system, comprising:
a nonvolatile memory area;
a first interface configured to be connected to a first host device;
a second interface configured to be connected to a second host device through wireless communication; and
a controller configured to control the first interface on a basis of a command provided from the second host device such that the first host device is prohibited to write data into the nonvolatile memory area, when the second host device writes data into the nonvolatile memory area through the second interface.

7. The memory system of claim 6, wherein
the first interface notices an error to the first host device when the first device writes data into the nonvolatile memory area in a state that the first interface is controlled such that the first device is prohibited to write data into the nonvolatile memory area.

8. The memory system of claim 6, wherein
the second host device transmits data from a memory portion of the nonvolatile memory area other than a portion of the nonvolatile memory area in which the second host device writes data into the nonvolatile memory area.

9. The memory system of claim 6, wherein
the controller automatically acts the first interface to prohibit writing date into the nonvolatile memory area, when receiving data from the second host device.

10. The memory system of claim 6, wherein
a state, in which the first host device is prohibited to write data into the nonvolatile memory area, is configured to be cancelled by being provided a cancel command from the second host device.

11. The memory system of claim 6, wherein
The second host device is configured to control the second interface so as to prevent to write data into the nonvolatile memory area from the first host device in a case that the second host device writes data into the nonvolatile memory area.

12. The memory system of claim 6, wherein
the second host device is configured to issue a cancel command so that the first interface issues an error to the first host device in the state where the first host device is prohibited to write data into the nonvolatile memory area.

13. The memory system of claim 6, wherein
the nonvolatile memory area includes an initialization time, and an initialization time of data written in the nonvolatile memory area by the second host device is configured to be set by the second host device.

14. A wireless communication method by a memory system, the memory system comprising a nonvolatile memory area, a first interface, a second interface and a control unit, comprising:
setting the memory system in a first host device;
connecting the second interface to a second host device through wireless communication;
controlling the first interface by the control unit to prohibit to write data from the first host device to the nonvolatile memory area on a basis of a command provided from the second host device; and
transmitting data from the second host device to the nonvolatile memory area.

15. The method of claim 14, wherein
the control unit is received a command from the second host device to provide the command to the first interface in the controlling the first interface.

16. The method of claim 14, further comprising:
issuing an error from the first interface to the first host device when the first host device writes data into the nonvolatile memory area, in a state that the first interface is controlled such that the first host device is prohibited to write data into the nonvolatile memory area.

17. The method of claim 14, further comprising:
the second host device transmits data from a memory portion of the nonvolatile memory area other than a portion of the nonvolatile memory area in which the second host device writes data into the nonvolatile memory area.

* * * * *